United States Patent
Hamilton

[11] 3,875,676
[45] Apr. 8, 1975

[54] VERTICAL CARD MAGNETIC COMPASS

[76] Inventor: Leslie A. Hamilton, 106 Neuhaus, Houston, Tex. 77017

[22] Filed: Dec. 12, 1973

[21] Appl. No.: 424,000

Related U.S. Application Data

[63] Continuation-in-part of Ser. No. 183,936, Sept. 27, 1971, abandoned.

[52] U.S. Cl. ............................... 33/345; 33/355 R
[51] Int. Cl. ..................... G01c 17/04; G01c 17/20
[58] Field of Search .............. 33/355 R, 355 A, 345

[56] References Cited
UNITED STATES PATENTS

| | | | |
|---|---|---|---|
| 2,422,960 | 6/1947 | Giannini | 33/350 |
| 2,552,332 | 5/1951 | Le Van | 33/355 |
| 2,638,683 | 5/1953 | Reece et al. | 33/345 |
| 3,217,420 | 11/1965 | Dinsmore | 33/355 |

FOREIGN PATENTS OR APPLICATIONS

| | | | |
|---|---|---|---|
| 118,699 | 7/1944 | Australia | 33/318 |

Primary Examiner—Richard E. Aegerter
Assistant Examiner—Richard R. Stearns
Attorney, Agent, or Firm—Fulbright & Jaworski

[57] ABSTRACT

The present invention relates to a dry magnetic compass having a self-contained, vertically oriented card specially suited, for example, for mounting on an airplane instrument panel. Because of the vertical display, the entire compass card can be seen in the correct position relative to the line of flight. The device includes a non-ferrous housing having a transparent face, a compass card in the vertical plane within the housing fully viewable through the transparent face, the compass card being journalled in the housing to rotate about a central axis perpendicular to the card, a magnet means journalled for rotation about a vertical axis within the housing, and gearing for translating rotative movement of the magnet means to the compass card. Rather than conventional fluid damping, the compass of the present invention is damped by utilization of eddy current effect.

3 Claims, 4 Drawing Figures

VERTICAL CARD MAGNETIC COMPASS

CROSS-REFERENCE TO RELATED APPLICATIONS

This is a continuation in part of my U.S. application Ser. No. 183,936, filed Sept. 27, 1971, for "Vertical Card Magnetic Compass", now abandoned.

BACKGROUND OF THE INVENTION

The present invention relates to a dry magnetic compass. While the discussion of this specification is directed primarily to use of the compass device for purposes of navigating an airplane, it will be understood, of course, that the device may be used in marine vessels, vehicles, etc.

It is well known that the Earth possesses lines of magnetic force that encircle the globe. These field lines, which are common to all magnets, possess properties that have been explored at great length for generations. The field lines form completely closed curves having no absolute direction but each line having a separate and distinct force. Each complete line or curve maintains two oppositely charged poles which are normally termed "North" ("N") and "South" ("S"). Each individual line of force possesses equally strong attraction in all directions.

The magnetic compass was developed at an early date in order to take advantage of the Earth's magnetic properties for navigational purposes. Conventional direct-indicating magnetic compasses for air navigation were developed decades ago and have remained relatively unchanged up to the present time, largely because they have been less subject to failure than more complex instruments.

The main component of the conventional avionic compass consists of a magnetized iron rod pivoted in the center. To this iron rod have been added a compass card and lubber line used for visual readings. Typically, the card and magnetized iron rod combination form a float that is positioned in a bowl of refined kerosene thereby relieving the pivot point. The magnet member urges the card to point in the direction of magnetic north and the compass rose, also mounted on the card, provides readings on the reverse side against the lubber line.

Although a relatively simple instrument, the directindicating magnetic compass is subject to a number of errors. Such errors are attributable to aircraft motion as well as the basic force of magnetism itself. The Earth's magnetic field provides a substantial force but, at close ranges, other magnetic forces such as cables, power lines and electromagnetic objects can easily distort compass readings. Another type of magnetic error, termed deviation, is the magnetic distraction present in an individual aircraft due to factors such as power systems and the like. Still another type of error is variation which is not a fault of the compass but of the unusual arrangement of the isogonic (magnetic field) lines of the Earth as well as the difference between the "geographic" and "magnetic" poles.

In addition to the magnetic faults of the simple compass, there are several types of errors that are associated with motion of an aircraft including magnetic dip, heeling, yaw and swirl error. A primary cause of magnetic dip is the phenomenon of northerly turning error. Since the direct-indicating magnetic compass relies on the horizontal portion of the Earth's magnetism, it tends to lose its effectiveness in areas where the horizontal forces are extremely weak such as the magnetic poles. In the same way, when the compass is in a normal unbanked position, the Earth's vertical force has no power to direct the compass. Also when a plane banks in turning to the right of a northerly position, the compass card also tilts thereby creating a false reading. Speed error may be a type of magnetic dip occurring when an aircraft changes speed when flying from east to west.

Heeling error occurs when an aircraft flying a straight course in a banked attitude forces the placement magnets to change attraction causing the compass card to slip. Yaw error is generally due to the difference in the power settings of multi-engine aircraft while swirl error (oscillation) occurs when the compass float liquid is set in motion, causing improper motion of the compass card.

All compasses of the non-gyroscopic type as used in present day aircraft require some means of damping. This is usually in the form of a fluid such as a kerosene based material. However, liquid damped compasses not only are subject to leakage and consequent malfunctioning, but surface tension and other effects may produce undesirable restraining forces introducing drag on the magnet system which in the case of high speed turns will induce unwanted swirl effects.

Despite the development of other compass devices, such as the various species of gyrocompasses, the direct-indicating magnetic compass remains a necessary and practically universal directional device for aircraft. Its indications are the reference points for gyroscopic equipment and hence must be as accurate as possible.

In addition to the problems associated with the direct-indicating magnetic compass as have just been discussed, the float-card combination of the typical aircraft compass is visible to the extent of only about 90° of its rose. In addition, the direction notations are transposed 180° in order to be observed and confusion can easily arise with respect to the polar scale. For example, when N appears adjacent the lubber line of the conventional aircraft magnetic compass, the "N" designation is actually in the south position relative to the Earth.

In view of the many shortcomings of the conventional magnetic compass, it would be advantageous to provide a directindicating magnetic compass that eliminates as many of the foregoing mentioned errors as possible and provides a compass card that eliminates confusion with respect to the observation of directional readings. A step in this direction was made several years ago by Kollsman in developing a magnetic compass wherein north, east, south and west positions were placed on the card as one would observe a map. The card was stationary relative to the aircraft and a needle was employed to indicate the direction of north, the needle being motivated by a magnet following another magnet combined with a float in a chamber with liquid for damping purposes. However, because the Kollsman device relied on a floating magnet it suffered many of the shortcomings noted previously with respect to magnetic compasses. In addition, the Kollsman compass did not indicate the nose of the craft being navigated and hence confusion arose with respect to directional indications.

In addition to the foregoing, applicant is aware of prior art including a text by Alfred Hine entitled *Mag-*

*netic Compasses and Magnetometers*, University of Toronto Press, 1968, as well as U.S. Pat. Nos. 2,406,341, 2,422,960 and 2,561,332. Also pertinent are Australian Patent No. 118,699 and British Patents Nos. 1888 and 609,395.

SUMMARY OF THE PRESENT INVENTION

The present invention is directed to a directindicating dry magnetic compass having a card oriented in the vertical plane and being rotatable in response to the rotation of a circular magnet relative to the Earth. The entire card of the compass is viewable by an observer and eliminates confusion with respect to directional indications since the direction designation on the card need not be transposed 180° from actual position. Furthermore, the vertical card magnetic compass of the present device eliminates the necessity of a float thereby obviating the heeling effect described previously with respect to conventional magnetic compasses. In addition, acceleration errors are reduced since the magnet(s) of the device of the present invention are fixed in a horizontal plane.

Movement of the circular magnet of the compass of the present invention is damped by eddy current thereby avoiding the undesirable aspects of liquid damping of conventional compasses. Thus, damping in the compass of the present invention is provided by a non-ferrous conductor spaced adjacent to the circular magnet such that an air gap is provided between the conductor and the magnet.

It is, therefore, an object of the present invention to provide a dry magnetic compass having a non-ferrous housing with a transparent face, a compass card in the vertical plane within the housing so as to be viewed through the face and being rotatable about a central axis perpendicular to the card, a circular magnet journalled for rotation about a vertical axis within the housing and gearing for translating rotative movement of the magnet to the compass card.

Still another object of the present invention is to provide such a compass device wherein damping is provided by eddy current effect thereby eliminating the requirement of a sealed housing internal liquid and expansion chambers normally found in conventional compasses.

A further object of the present invention is to provide a dry magnetic compass that is comprised of a non-ferrous housing, a transparent face forming one wall of the housing, a non-ferrous support member secured within the housing, a circular compass card having a shaft journalled to the support member and further having a bevel gear secured thereon, a circular magnet having a downwardly extending shaft and journalled to the support member with a bevel gear to engage the bevel gear of the compass card, and means for eddy current damping of the circular magnet.

Still other and further objects, features and advantages will be apparent in the following description of preferred embodiments of the invention, given for the purpose of disclosure and taken in conjunction with the accompanying drawings.

DESCRIPTION OF THE DRAWINGS

In the drawings forming a part of the disclosure herein, like character references designate like parts throughout the several views wherein.

DESCRIPTION OF THE PREFERRED EMBODIMENT

Figure 1:
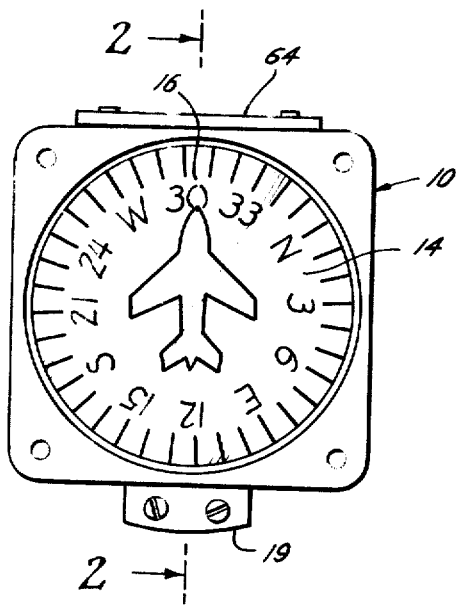
FIG. 1 is an elevation front view showing the full vertical card having directional indicators thereon in their true positions and a lubber line affixed to the housing.

With references to FIG. 1, the magnetic compass of the present invention is shown as it appears to the observer. It includes a non-ferrous housing 10 having a transparent face (the face being designated by reference numeral 12 in FIGS. 2 and 3) through which may be viewed a full compass card 14. It will be noted that the compass card 14 includes the direction designations in true positions one with respect to the other. A lubber line 16 preferably having the form of an aircraft is affixed to the transparent face 12. Since the housing 10 is adapted to be secured to, for example, the instrument panel of an airplane or other moving craft, the lubber line 16 is stationary relative to the craft.

Figure 2:
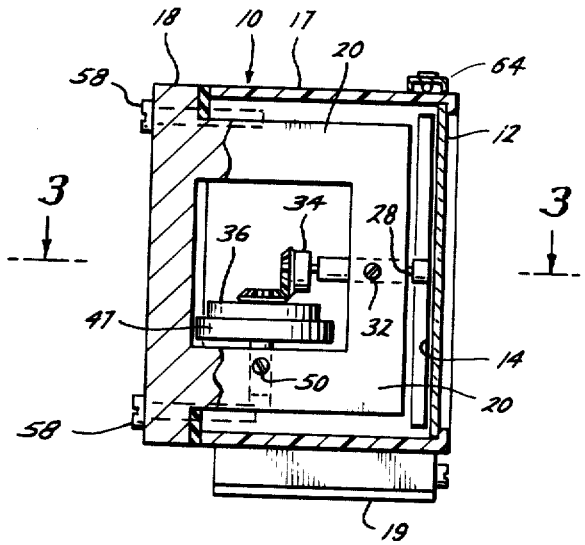
FIG. 2 is a cross-sectional side view.
Figure 3:
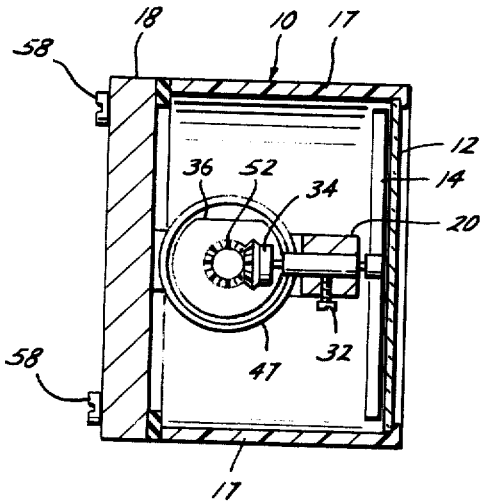
FIG. 3 is a cross-sectional plan view taken along the line 3—3 of FIG. 2.
Figure 4:
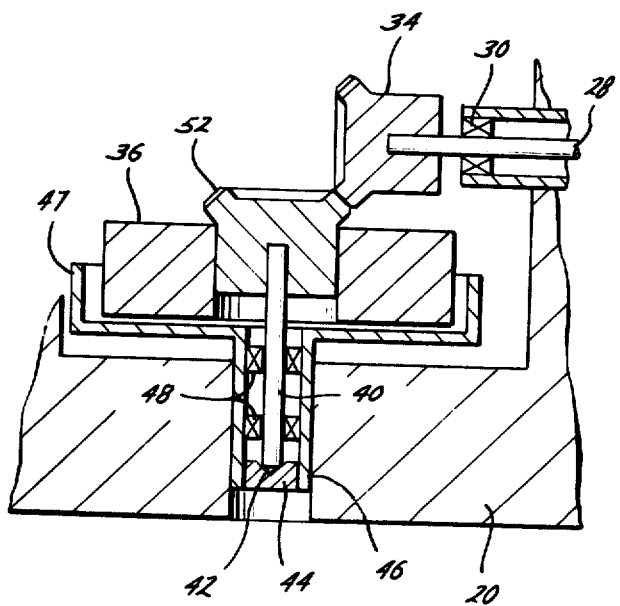
FIG. 4 is a partial view partially in cross section showing the gearing for translating movement of the magnets to the vertical card.

With respect variously to FIGS. 2, 3 and 4, the non-ferrous housing 10 preferably is comprised of a main housing portion 17 having a back wall member 18. A transparent plate or face 12 is secured to the main housing 17 and forms one wall of the housing 10. The back wall portion 18 of the housing is provided with a non-ferrous support member 20 generally in a "C" shape and formed integrally of the back wall portion 18 as shown in FIG. 2, or secured by means of suitable bolts. Preferably, the housing is of dust-proof construction.

With reference particularly to FIG. 4 for detail and generally to FIGS. 2 and 3, the circular compass card 12 is provided with a central shaft 28 secured to the card perpendicular to and rearward of the face thereof. The shaft 28 is journalled for rotation within a sleeve or journal bearing assembly 30 secured within the support member 20 such as by means of a set screw 32. The shaft 28 also has secured thereto a bevel gear 34.

Magnet means are provided within the housing 10. As shown in best detail in FIG. 4, the magnet means comprises at least one circular magnet 36. The magnet 36 is journalled for rotation about a vertical axis within the housing by means of a downwardly extending shaft 40. The shaft 40 also forms a pivot having a point 42 which engages a cap jewel 44 within a cylinder 46 that also includes at least two hole jewels 48 to properly position the shaft 40 for rotation. The sleeve 46 having bearings 44 and 48 therein is secured to the support member 20 by means of a set screw 50 as shown in FIG. 2.

Secured to and preferably formed integrally of the sleeve 46 is a shield or conductor 47 formed of a non-ferrous metal such as copper, aluminum, brass, gold and the like. The shield or conductor 47 is spaced adjacent to the circular magnet 36 such that an air gap is provided therebetween. The function of the non-magnetic shield or conductor 47 is to provide eddy current damping of the magnet 36 thereby eliminating free oscillation of the magnetic assembly. This damping function is normally provided by fluid in conventional compasses but with the attendant undesirable features attributable to the liquid as explained previously.

Secured to the upper portion of the magnet 36 is a bevel gear 52, the teeth of which meshingly engage the teeth of the bevel gear 34. The bevel gear 52 also secures the shaft 40 to the magnet 36.

Preferably, a light patch 64 having a suitable light filament is secured to the housing 10 to provide lighting compatible with standard aircraft lighting systems. Also, a suitable polyplane compensator means 19 preferably is provided to compensate for magnetism in the aircraft as will be understood by those skilled in the art.

In operation, when the device of the present invention is assembled as shown in the drawings, the housing 10 is attached to the instrument panel of an airplane or other craft so that the transparent face 12 is generally in the vertical plane. Thus, the card 14 of the compass may be viewed as depicted in FIG. 1 whereby the lubber line 16 points in the forward albeit upward direction of the craft and is stationary in that position relative to the craft. Therefore, as the craft moves relative to the Earth, the magnet 36 rotates to align its polarity with the Earth's polarity. The movement of the magnet is transmitted to the card 14 by means of the bevel gears 52 and 34 and related shafts so that the card 14 rotates to indicate the direction of the craft. As shown in FIG. 1, the craft has a heading of approximately 305 degrees and depicts the true positions of North, East, South and West on the compass card as if one were reading a map.

It will now be appreciated that, by eliminating the float of conventional direct-indicating magnetic compasses, heeling problems of conventional compasses are eliminated and the full card in the vertical position presents a complete view of the compass rose to eliminate confusion of directional orientation. The dry, eddy current damped compass of the present invention is free of problems inherent in conventional wet compasses and is uniquely suited for installation in, for example, an aircraft instrument panel to blend with other circular instruments.

The present invention, therefore, is well adapted to carry out the objects and attain the ends and advantages mentioned as well as others inherent therein.

What is claimed is:

1. A dry magnetic compass for use in an aircraft comprising,
   a. a non-ferrous housing,
   b. a transparent, vertically oriented plate secured to and forming one wall of the housing (a) and having a lubber line in the outline of an aircraft thereon,
   c. a non-ferrous support member adapted to be secured within the housing (a),
   d. a vertically oriented, circular compass card spaced adjacent the transparent plate (b) and indicating true compass positions thereon and having a central shaft secured to the card perpendicular to and rearward of the face thereof, the shaft being journalled to the support member (c) and having a bevel gear secured thereon.
   e. a circular magnet to which is secured a downwardly extending vertical shaft that is rotatably journalled in the support member (c), the circular magnet having a bevel gear secured to the upper portion thereof to meshingly engage the bevel gear of the compass card, and
   f. means for eddy current damping of movement of the magnet (e).

2. The invention of claim 1 wherein, more specifically, the eddy current damping means (f) comprises a non-ferrous conductor spaced adjacent to the circular magnet (e) such that an air gap is provided therebetween.

3. The invention of claim 2 wherein the non-ferrous conductor is a shield formed of a non-magnetic metal.

* * * * *